Patented Mar. 22, 1938

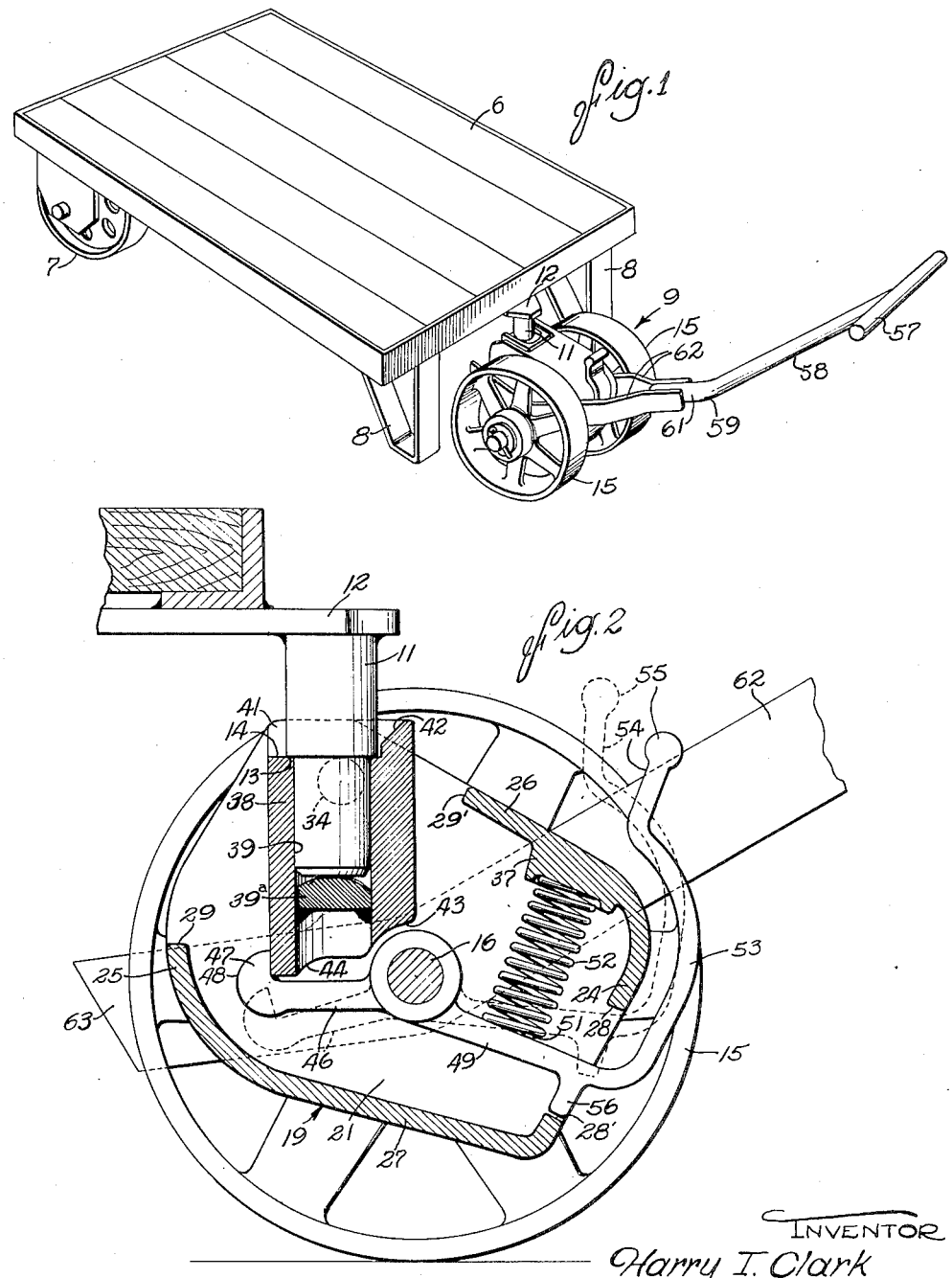

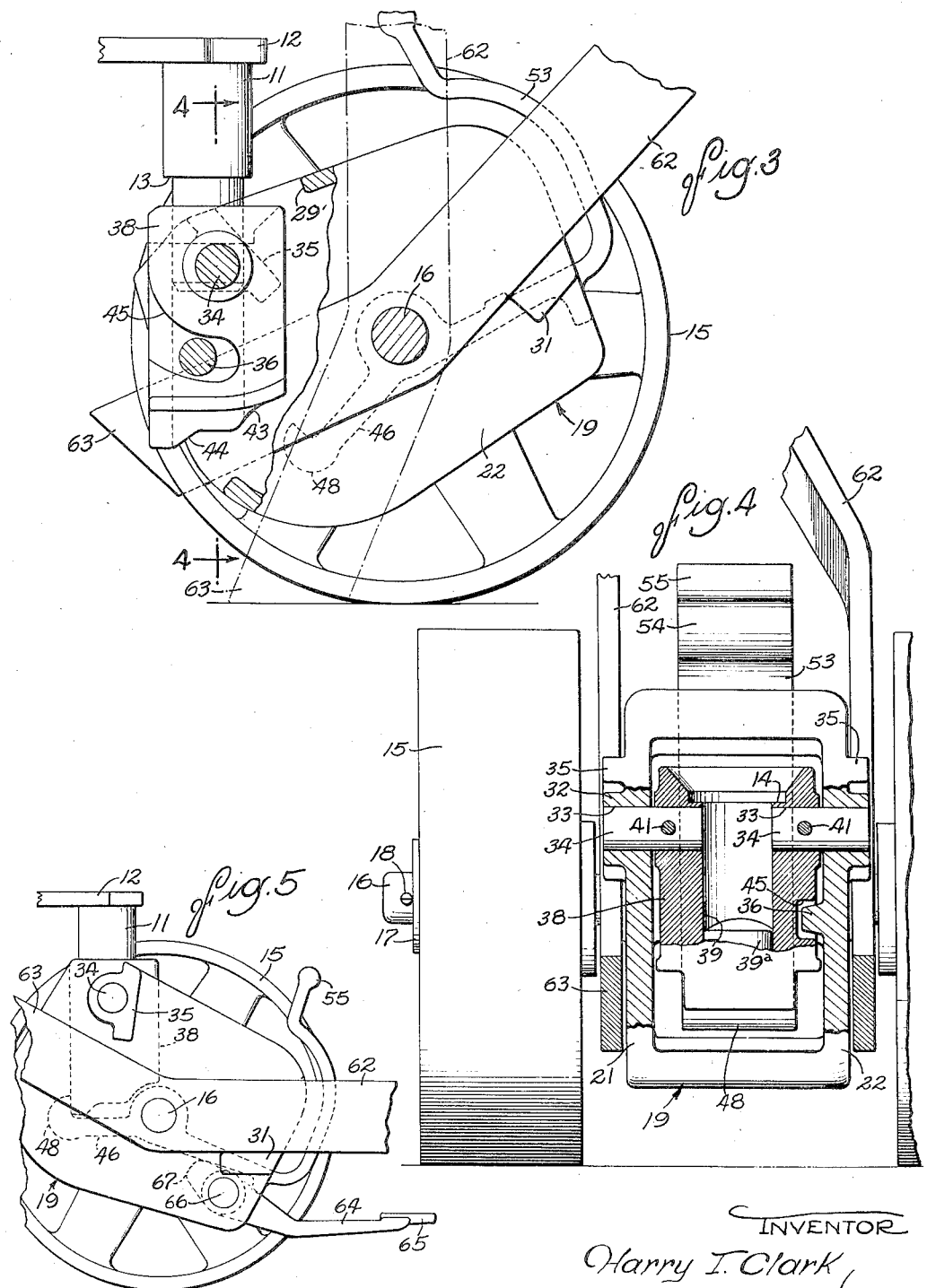

2,111,554

UNITED STATES PATENT OFFICE 2,111,554

TRUCK DOLLY

Harry I. Clark, Rockford, Ill., assignor to All Steel Welded Truck Corporation, Rockford, Ill., a corporation of Delaware Application March 29, 1937, Serial No. 133,549

10 Claims. (Cl. 280—46)

The invention disclosed herein pertains to material handling equipment of the truck and detachable dolly type and more particularly to the construction of the wheel jack or dolly which serves not only as a wheel support for the wheelless end of the truck but also as a jack for lifting the truck onto the dolly wheels in connecting the truck and dolly together.

Several types of the class of equipment to which the invention belongs have been known and in use for some time past and are, generally speaking, quite valuable as time and energy saving machinery. Nevertheless, such prior equipment has many objections among which may be mentioned the expense of manufacture and the consequent high initial cost to the user. The complicated number, character, and arrangement of the parts which result not only in a weaker assembly but are inconvenient to operate, require a greater floor area for attachment of the dolly to the truck, and sometimes introduce hazards to the safety of the operators.

One of the primary objects of the invention is to provide an arrangement of a truck and truck lifting and transporting dolly wherein the truck and dolly have simple, economic, and effective means for quickly and easily connecting and disconnecting one with the other, wherein the dolly and its mechanisms for lifting, securing, swiveling, pushing or pulling, and releasing the truck may be constructed with a minimum number of rugged parts, and wherein the dolly and its various parts may be made into a compact, neat, and easily and safely manipulated form with all of the benefits to be derived therefrom.

Other objects as well as the numerous advantages and uses of the invention will appear from the following description taken in connection with the accompanying drawings, in which Figure 1 is a perspective view of a connected truck and dolly embodying one preferred form of the invention.

Fig. 2 is a large scale longitudinal section taken along a plane passing through the center of the dolly transversely of the axle thereof, with only part of the truck structure showing but with the dolly mechanism in the position occupied when the truck front is raised and the truck is ready to be moved about.

Fig. 3 is a view similar to the view of Fig. 2 except that the section is taken along a plane forward (relative to the plane of the drawings) of the plane of section of Fig. 2, with the mechanism shown in that position where the dolly is just being engaged with the truck.

Fig. 4 is a section taken substantially along the line 4—4 of Fig. 3 looking in the direction of the arrows.

Fig. 5 is a view on a reduced scale of a modified construction, taken along a plane of section through a dolly, corresponding to the plane of section of the view of Fig. 3.

The truck chosen for illustration of the invention comprises a platform 6 which at its rear is provided with wheels 7 (only one shown) and which at its front is provided with skids or legs 8 adapted to support the front end of the truck upon the floor or ground when the truck is not being moved about by a dolly generally designated 9. The front end of the truck intermediate the legs or skids 8 is provided with a depending post or coupling pin 11 which may be composed of steel and firmly secured as by welding to a plate 12 in turn firmly and securely fastened to the bottom of the platform 6. The post or coupling pin 11 is provided with a thrust bearing shoulder 13, which, when engaged with a corresponding shoulder 14 carried by a part of the dolly in a manner to be described, supports and positions the front end of the truck with respect to the dolly and holds the legs or skids 8 above the floor or ground while the truck is being moved about.

The dolly is provided with a pair of broad tired wheels 15 rotatably mounted in spaced relation to one another upon an axle 16 and held against outward displacement therefrom by suitable thrust washers 17 and cotter pins or other securing means 18 passing transversely through the axle. Rotatably mounted on the axle 16 and centrally in the space between the wheels 15 is a box-like housing member generally designated 19 and having substantially parallel side walls 21, 22, a front wall 24, a rear wall 25, and top and bottom walls 26 and 27 respectively. The front wall 24 is terminated at places 28, 28' to provide an opening therebetween at the front of the housing member and the rear and top walls 25 and 26 are terminated at places 29, 29' respectively to provide therebetween a rearward opening in the housing member. At the forward portion of each side wall is a lug 31 and at a rearward portion, each side wall is provided with a bearing boss 32 surrounding alined holes 33 within which trunnion pins 34 are rotatably disposed. Integral with the bosses 32 are lugs 35 which function in a manner hereinafter described while projecting internally of the housing are bosses 36 and 37 the functions of which will also be described hereinafter.

A block or socket coupling member 38 (hereinafter referred to simply as block 38) having a vertical bore 39 for reception of the reduced lower end of coupling pin or post 11 has transversely alined holes adjacent to its upper end for reception of the inner ends of trunnion pins 34 which are secured to the block 38 as by set screws 41. Thus, the block or socket member 38 is journaled for swinging movements relative to the housing member 19 although movable therewith about the axle 16 and, owing to the position of the axis of the trunnion pins 34 above the center of gravity of the block, the block will tend to remain at all times with the axis of the bore 39 disposed in a vertical direction. The upper end of the block 38 is cut away at the center and at the rear as indicated at 41, and the walls defining the mouth of the opening to the bore 39 are beveled as at 42 to aid in receiving and guiding the end of the coupling pin 11 within the bore 39. To provide additional supporting surface area, a plug 38ᵃ is secured as by welding within the bore 39 so as to engage and support the pin 11 from its lower end when the pin is in coupled position as shown in Fig. 2. The lower end of block 38 has curved surfaces 43 and 44 for purposes which will later appear. One side of the block is provided with an arcuate slot 45 concentric with the axes of the trunnion pins 34 for the reception of boss 36 which when abutted with the end of the slot limits rotational movement of the block 38 in one direction.

Rotatably mounted intermediate its ends and upon axle 16 between the side walls of the housing member 19 is a latch lever, the rearward arm 46 of which has a latch jaw 47 arranged to engage the back of the rear wall of the block 38 and to secure the block against movement in one direction relative to the housing member when the block is in its upper or truck supporting and carrying position. The latch jaw 47 may have its rearward surface rounded or beveled as at 48 for engagement with the surface 44 on the bottom of the block 38 whereby to effect a camming action to depress the latch body and permit it to engage behind the block as the block is moved from a lower to an upper position.

The other arm 49 of the latch lever is provided with a boss or lug 51 in alinement with and facing toward the boss 37 on the housing member and serves to position a coiled compression spring 52 which is disposed thereover at one end and which at its other end is received within a socket formed in the boss 37. The spring 52 normally urges the latch lever about its pivot on axle 16 in a clockwise direction viewing Figs. 2 and 3 and thereby holds the latch jaw 47 in a position where it is engaged behind or may engage behind the lower end of block 38.

The arm 49 is continued through the opening in the front wall and thence extends upwardly about and in close proximity to the housing 19 as indicated at 53 for a substantial distance and thence outwardly away from the housing as indicated at 54 where it terminates in an enlarged end 55. It will be observed that pressure upon the portion 54 or 55 of the latch lever in a counterclockwise direction as viewed in Figs. 2 and 3, that is, in a generally horizontal direction away from an operator holding the handle 58, will serve to compress the spring 52 and will release the latch body 47 from its engagement with the block 38. The arm 49 of the latch lever may be provided with a depending projection 56 adapted to contact with the lower portion of the front wall of the housing at the place 28 to limit movement of the lever under the action of the spring 52.

The dolly is provided with a handle 57 having a tongue 58 which may be bent slightly upward as at 59 from a lower portion 61 which may be welded or otherwise firmly secured to forked arms 62. The forked arms 62 straddle the housing member 19 and are pivoted upon the axle 16 between the housing side walls and the hubs of wheels 15. The arrangement is such that the handle may be moved freely with respect to the wheels and freely relative to the housing 19 between lugs 31 and 35 which lugs are so faced as to engage the arms 62 after predetermined relative movements thereof with respect to the housing. The arms 62 may be continued rearwardly of the axle and at an obtuse angle in a relatively upward direction to the main portions thereof to provide supporting legs or stands 63 adapted to support the handle 57 and tongue 58 in a substantially vertical position whether the dolly be connected to a truck or disconnected therefrom.

In operating the dolly to pick up and transport a truck, the dolly will be backed under the front of the truck until the lower end of the depending truck coupling pin 11 rides into the opening 41 of the block 38 and is substantially centered with respect to the bore 39 in the block. At this time, the handle 57 will be depressed or rocked downwardly until the arms 62 engage the lugs 31 whereupon further downward movement of the handle will serve to rock the housing about the axle 16 thereby raising the block 38 until the shoulder 14 of the block engages the thrust shoulder 13 on the coupling pin 11 and the front end of the truck is raised to a desired and predetermined height. As the block 38 rises with respect to the axle 16, its lower end swings inwardly toward the axle, the beveled surfaces 44 and 48 depressing the latch jaw 47 until the latch jaw clears the rearward edge of the block at which time the latch jaw snaps behind the rearward edge of the block and locks it against rearward and downward movement.

The cut away or curved surface 43 on the lower end of the block permits the lower end of the block to move in closely adjacent to the pivoted portion of the latch lever and acts as a stop to prevent clockwise movement of the block beyond a predetermined position which preferably is a position where the axes of the trunnion pins 34 are above and only slightly rearward of the axis of the axle 16. In this position of the parts, the handle is free to be raised or lowered to a position best suited for the operator to push or pull the dolly and its attached truck to any place desired and as the coupling pin 11 is arranged to swivel freely in the block 38, the dolly may be turned sharply in either direction to change the course of travel of the truck as may be desired on either backward or forward movements. Furthermore, the dolly may be coupled with a truck from almost any angle limited only by the positions of the supporting legs or skids 8 and their obstructing effect on movements of the dolly.

When it is desired to release the dolly from a truck, the operator may raise the handle to position the arms 62 approximately in the position indicated by the dotted lines in Fig. 2 at which position the portions 54 and 55 of the latch lever will be disposed as shown in full lines in Fig. 2. A light blow applied generally horizontally in a counter-clockwise direction by the operator's foot upon portion 54 or portion 55 of the latch lever, or an even push or thrust applied in a counterclockwise or rearward direction from the operator's foot placed against portion 54 or portion 55 will compress the spring 52 and release the latch jaw 47 from behind the lower end of block 38 so that the housing member 19 will be rocked in a counter-clockwise direction carrying the block 38 downwardly to release the coupling pin 11 at which time the skids or leg supports 8 will be lowered to the floor. The released positions of the foot engaging portions of the latch lever are indicated in dotted lines in Fig. 2. It will be noted that the width of each of the portions 53, 54, and 55 of the latch lever is less than the width of the front wall of the housing member 19 and considerably less than the distance between the fork arms 62 of the handle tongue; also, considerable clearance is allowed between the outer end 55 of the latch lever and the inwardly converging portions of the arms 62 so that there is no chance for the handle and latch lever to jamb.

When the handle is in the dotted line position of Fig. 2, the foot engaging end of the latch lever is readily accessible for engagement by the operator's foot and the operator is not in danger of having his foot caught between the latch lever and the handle as has been the case with certain prior constructions of equipment of this character. Also, there is no danger of the operator's foot being caught by the latch lever in the movement of the latter as the truck is lowered following release of the latch. Nor are the foot engaging portions of the latch lever easily accessible for releasing engagement by the operator's foot when the handle is in any ordinary position where it might be when the operator is desirous of releasing the latch to deposit a truck. In fact, the foot engaging portions will be disposed in a position where they are relatively inaccessible for engagement by the operator's foot unless the arms 62 be raised to a position such as that indicated in dotted lines in Fig. 2. It would be exceedingly awkward for the operator to reach either portion 54 or portion 55 for tripping or releasing the latch unless he did move the handle to a position where no injury to himself could occur. The construction is such that with the exception of the handle and its tongue, all moving and operating parts of the dolly are confined substantially within the space defined by the space between the wheels and the wheel diameters.

The construction and arrangement of the parts of the dolly are also such as materially to simplify and to compact the structure so as to enable the dolly to be used in otherwise relatively inaccessible places, and it may be operated or stored in a minimum of space. Because of its compactness, it is able to be turned on short radius and the tongue can be handled at any angle from the vertical to the horizontal whether the dolly be connected to a truck or disconnected therefrom.

The compactness of the dolly is due in part to the novel manner in which the component parts are constructed and in part to the simplified arrangement of the parts. It may be noted in this connection that the length of axle 16 between washers 17 is merely sufficient for assembly of the various parts thereon with working clearances between relatively moving parts, and that it is unnecessary to secure any part or parts to the axle. While the dolly itself is relatively inexpensive, one dolly may be used for handling any number of trucks or truck platforms and a dolly connected with the truck takes up a minimum of space in addition to that actually occupied by the truck or truck platform whether loaded or unloaded.

Inasmuch as it may be desirable to ease the truck legs or skids 8 to the floor or ground so that there will be no jar or bump as, for instance, when the truck platform may be loaded with crockery, a special latch tripping lever as illustrated in Fig. 5 may be added. As shown in this figure, a foot lever 64 having a tread portion 65 may be pivotally mounted on a pivot 66 journaled in the side walls 21 and 22 of the housing 19. The inner or rearward end 67 of lever 64 is formed as a cam adapted at all times to rest against the bottom face of the arm 49 of the latch lever so that when the operator steps upon the tread portion 65, the latch will be swung in a counter-clockwise direction about its pivot to effect release of the block 38. When the platform and its load are to be eased to rest upon the skids or leg supports 8, the operator will bring the handle 57 down to a position where the forked arms 62 are engaged with the lugs 35, and while firmly holding the handle down in such position, he will step upon the tread 65 to release the latch. The operator, still holding the lever 64 depressed, will then ease up on the handle and allow the housing member 19 gradually to rotate in a counter-clockwise direction under the pressure of the load until the leg supports or skids 8 contact with the floor or ground whereupon the dolly may be removed.

While a preferred embodiment of the invention and a modification thereof have been illustrated and described, it will be apparent that various changes may be made in the construction and that other modifications may be devised without departing from the spirit of the invention or the scope of the appended claims.

I claim as my invention:

1. In a truck dolly of the character described, an axle, a pair of wheels mounted upon said axle in spaced relation to one another, a housing pivotally mounted upon said axle between said wheels, a block pivotally mounted in said housing on an axis substantially parallel to said axle and spaced rearwardly radially of the axle, said block having a vertically directed socket within which a coupling pin may engage, the center of gravity of said block being normally below the axis of its pivot mounting, a latch member pivotally mounted intermediate its ends and within said housing upon said axle and having one end adapted to engage the lower end of said block, a spring connected between said housing member and said latch member and normally urging said latch toward engaging position, an operating handle pivotally mounted upon said axle independently of said housing exteriorly of the latter, means carried by said housing and engageable by said handle when the handle is moved in one direction about its pivot for swinging said housing in the same direction and to engage said latch and block, and means for releasing said latch from said block.

2. In a truck dolly of the character described, an axle, a pair of wheels mounted upon said axle in spaced relation to one another, a box-like housing mounted intermediate its ends on said axle between and pivotally movable with respect to said wheels, a coupling member pivotally mounted within said housing on a horizontal axis above its center of gravity and in spaced relation to said axle, a lever pivotally mounted within said housing on said axle, said lever pivot being intermediate the ends of the lever, means including a latch dog on one end of said lever for engaging and securing said coupling member against pivotal movements with respect to said housing after a predetermined rotational movement of said coupling member about said axle, said dog being normally urged toward coupling member engaging position, an operating handle pivotally carried by said axle, means carried by said housing and engageable by said handle when the handle is moved in one direction for imparting a rotational movement to said housing, and means connected with the other end of said lever and projecting through an opening in said housing for tripping said latch.

3. In a truck dolly of the character described, an axle, a pair of wheels mounted upon said axle in spaced relation to one another, a box-like housing mounted intermediate its ends upon said axle between and pivotally movable with respect to said wheels, a coupling member pivotally mounted within an opening in one end of said housing on an axis substantially parallel to the axis of the axle, the pivot axis of said coupling member being above the center of gravity of the coupling member and in spaced relation to the axle, a lever pivotally mounted intermediate of its ends on said axle and within said housing for swinging movements relative to said housing, a latch dog on one end of said lever for engaging and securing said coupling member against pivotal movement in one direction relative to said housing after a predetermined rotational movement of said coupling member about said axle, means normally urging said latch dog toward coupling member engaging position, an operating handle having forked arms straddling said housing and pivotally carried by said axle, means carried by said housing and adapted to be engaged by said handle for imparting a rotational movement to said housing in a direction to effect said predetermined rotational movement of said coupling member, and means connected with said lever and projecting out of said housing through an opening therein for tripping said dog.

4. In a truck dolly of the character described, an axle, a pair of wheels mounted upon said axle in spaced relation to one another, a box-like housing mounted intermediate its ends upon said axle between and pivotally movable with respect to said wheels, a coupling member pivotally mounted within an opening in a rearward end portion of said housing on an axis substantially parallel to the axis of the axle, the pivot axis of said coupling member being above the center of gravity of the coupling member and in spaced relation to the axle, a lever pivotally mounted intermediate of its ends on said axle and within said housing for swinging movements relative to said housing, a latch dog on one end of said lever for engaging and securing said coupling member against pivotal movement in one direction relative to said housing after a predetermined rotational movement of said coupling member about said axle, means within said housing normally urging said latch dog toward coupling member engaging position, an operating handle having forked arms straddling said housing and pivotally carried by said axle, means carried by said housing and adapted to be engaged by said handle for imparting a rotational movement to said housing in a direction to effect said predetermined rotational movement of said coupling member, the other end of said lever projecting through an opening in the forward end portion of said housing and extending upwardly and outwardly therefrom and adapted to pass between said forked arms, and a second lever pivotally mounted upon and projecting from said housing below said handle engaging means and operatively associated with the first said lever for tripping said latch dog.

5. In a truck dolly of the character described, an axle, a pair of wheels mounted upon said axle in spaced relation to one another, a housing mounted intermediate its ends upon said axle between and pivotally movable with respect to said wheels, a coupling member pivotally mounted within an opening in one end of said housing on an axis substantially parallel to the axis of the axle, the pivot axis of said coupling member being above the center of gravity of the coupling member and in spaced relation to the axle, a lever pivotally mounted intermediate of its ends on said axle and within said housing for swinging movements relative to said housing, a latch dog on one end of said lever for engaging and securing said coupling member against pivotal movement in one direction relative to said housing after a predetermined rotational movement of said coupling member about said axle, means normally urging said latch dog toward coupling member engaging position, an operating handle having forked arms straddling said housing and pivotally carried by said axle, and means carried by said housing and engageable by one of said forked arms for imparting a rotational movement to said housing in a direction to effect said predetermined rotational movement of said coupling member, the other end of said lever being continued through an opening in a forward portion of said housing and thence extended upwardly in close proximity to said housing between the paths of movement of said forked arms for tripping engagement by an operator.

6. In a truck dolly of the character described, an axle, a pair of wheels mounted upon said axle in spaced relation to one another, a housing pivotally mounted upon said axle between said wheels, said housing including spaced side walls extending generally parallel to the planes of rotation of said wheels, a coupling block pivotally mounted within an opening in a rearward portion of said housing on an axis substantially parallel to said axle and spaced radially of said axle, said block having means for interengagement with a truck, a latch member pivotally mounted intermediate its ends on said axle and within said housing, said latch member having its rearward end arranged to latch with said block at a place below the pivot axis of the block upon a predetermined rotational movement of said housing, the other end of said latch member being extended through an opening in a forward portion of said housing member, means within said housing member normally urging said latch member into block engaging position, an operating handle having forked arms pivotally mounted on said axle between said housing side wall and said wheels, and means carried by said housing side walls and engageable by said forked arms for imparting said rotational movement to said housing member.

7. In a truck dolly of the character described, an axle, a pair of wheels mounted upon said axle in spaced relation to one another, a housing pivotally mounted upon said axle between said wheels, said housing including spaced side walls extending generally parallel to the planes of rotation of said wheels, a coupling block pivotally mounted within an opening in a rearward portion of said housing on an axis substantially parallel to said axle and spaced radially of said axle, said block having means for interengagement with a truck, a latch member pivotally mounted intermediate its ends on said axle and within said housing, said latch member having its rearward end normally urged toward and arranged to latch with said block at a place below the pivot axis of the block upon a predetermined rotational movement of said housing member, the other end of said latch member being extended through an opening in a forward portion of said housing member and then upwardly for a substantial distance about the housing between the paths of movement of said forked arms and thence outwardly at an angle and for latch tripping engagement by an operator's foot, an operating handle having forked arms pivotally mounted on said axle between said housing side wall and said wheels, and means carried by said housing side walls and engageable by said forked arms for imparting said rotational movement to said housing member.

8. In a lift dolly of the character described, an axle, a pair of wheels mounted in spaced relation upon said axle, a box-like housing having substantially parallel side walls rotatably mounted upon said axle with said axle extending through said side walls, a coupling block pivotally secured to and mounted between said side walls within an opening in a rearward portion of said housing member and upon an axis spaced rearwardly of said axle, a lever pivotally mounted intermediate its ends upon said axle within said housing, one end of said lever having means for engaging said block for latching the block against pivotal movements in one direction, means normally urging said lever about its pivot into block engaging position, means extending outwardly of said housing for moving said lever to disengage the same from said block, a handle having a pair of arms straddling said housing member, each of said arms being pivotally mounted upon said axle between a side wall of said housing member and an adjacent wheel, and interengageable means on said housing side walls and handle arms for imparting to said housing member a rotational movement in a direction to effect latching engagement between said lever and said block.

9. In a lift dolly of the character described, an axle, a pair of wheels mounted in spaced relation upon said axle, a box-like housing having substantially parallel side walls rotatably mounted upon said axle with said axle extending through said side walls, a coupling block pivotally secured to and mounted between said side walls within an opening in a rearward portion of said housing member and upon an axis spaced rearwardly of said axle, a lever pivotally mounted intermediate its ends upon said axle within said housing, one end of said lever having means for engaging said block for latching the block against pivotal movements in one direction, said lever being normally urged about its pivot into engaging position, the other end of said lever being extended through an opening in the housing member on the opposite side of said axle from said block and thence extending upwardly and forwardly of said housing member, a handle having a pair of arms straddling said housing member and the other end of said lever, each of said arms being pivotally mounted upon said axle between a side wall of said housing and an adjacent wheel, and interengageable means on said housing side walls and handle arms for imparting to said housing a rotational movement in a direction to effect latching engagement between said lever and said block.

10. In a truck dolly of the character described, an axle, a pair of wheels mounted upon said axle in spaced relation to one another, a housing pivotally mounted upon said axle between said wheels, a coupling block pivotally mounted in said housing on an axis substantially parallel to said axle and spaced rearwardly radially of the axle, said block being cooperatively engageable with a coupling member carried by a truck, the center of gravity of said block being normally below the axis of its pivot mounting, a latch member pivotally mounted intermediate its ends and within said housing upon said axle and having one end adapted latchingly to engage said block at a place below the pivot axis of the block, said latch member being normally urged toward engaging position, an operating handle pivotally mounted upon and extending forwardly from said axle independently of said housing member, means carried by said housing and engageable by said handle when the handle is moved in one direction about its pivot for swinging said housing member in the same direction and to engage said latch and block, means for releasing said latch from said block, and means for supporting said handle in a substantially vertical position comprising a leg member rigidly secured to said handle and extending rearwardly beyond said axle, said leg member projecting beyond the outer circumference of one of said wheels and being inclined in an upward sense at an obtuse angle to the general direction of the length of the handle.

HARRY I. CLARK.